United States Patent
Sethi et al.

(10) Patent No.: US 12,346,232 B2
(45) Date of Patent: Jul. 1, 2025

(54) SYSTEM AND METHOD FOR CONFIGURING A SERVER DISPLAY

(71) Applicant: Dell Products L.P., Round Rock, TX (US)

(72) Inventors: Parminder Singh Sethi, Punjab (IN); Suren Kumar, Bangalore (IN); Veena Ramarao, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 297 days.

(21) Appl. No.: 17/648,571

(22) Filed: Jan. 21, 2022

(65) Prior Publication Data

US 2023/0236945 A1 Jul. 27, 2023

(51) Int. Cl.
| | |
|---|---|
| *G06F 11/32* | (2006.01) |
| *G06F 9/4401* | (2018.01) |
| *G06F 11/30* | (2006.01) |
| *G06N 20/20* | (2019.01) |

(52) U.S. Cl.
CPC .......... *G06F 11/328* (2013.01); *G06F 9/4401* (2013.01); *G06F 11/3051* (2013.01); *G06F 11/3058* (2013.01); *G06N 20/20* (2019.01)

(58) Field of Classification Search
None
See application file for complete search history.

(56) References Cited

U.S. PATENT DOCUMENTS

| | | | |
|---|---|---|---|
| 2006/0190532 A1* | 8/2006 | Chadalavada | H04L 63/10 709/203 |
| 2009/0055157 A1* | 2/2009 | Soffer | G06F 15/7864 703/27 |
| 2009/0157867 A1* | 6/2009 | Farmer | G06F 3/1431 709/224 |
| 2013/0318371 A1* | 11/2013 | Hormuth | G06F 11/3062 713/320 |
| 2014/0130041 A1* | 5/2014 | Luxenberg | G06F 9/45558 718/1 |
| 2014/0344431 A1* | 11/2014 | Hsu | H04L 41/0213 709/223 |
| 2020/0356380 A1* | 11/2020 | Kelly | G06F 9/4403 |
| 2021/0125002 A1* | 4/2021 | Thakur | G06F 9/3836 |

* cited by examiner

*Primary Examiner* — Schquita D Goodwin
*Assistant Examiner* — Ishrat Rashid
(74) *Attorney, Agent, or Firm* — DALY, CROWLEY, MOFFORD & DURKEE, LLP (57) ABSTRACT

In one aspect, an example methodology implementing the disclosed techniques can include, by a baseboard management controller (BMC), responsive to a virtual console of a server being launched on a client device via the BMC, collecting one or more environment parameters of the client device and collecting one or more environmental parameters of the server. The method can also include, by the BMC, determining an appropriate display configuration for the server based on an analysis of the one or more environment parameters of the client device and the one or more environmental parameters of the server and configuring a display configuration of the server in accordance with the determined appropriate display configuration.

20 Claims, 5 Drawing Sheets

| | Reference ID | Client Device ID | User ID | Server Hostname | Server Display Config ID |
|---|---|---|---|---|---|
| 320 | 95C51E1A4CLOUD | DEV_95C5 | 123e4567-e89b-12d3-a456-426614174000 | Cloudhost-1 | Config1 |
| 322 | 412S1E1A4CLOUD | DEV_412S | 123e4567-e89b-12d3-a456-426614174000 | Cloudhost-1 | Config2 |
| 324 | 673D1E1A4CLOUD | DEV_673D | 123e4567-e89b-12d3-a456-426614174000 | Cloudhost-1 | Config3 |
| 326 | 95C54E1A1CLOUD | DEV_95C5 | 4567123e-e85b-179e-a736-193614174050 | Cloudhost-1 | Config4 |
| 328 | 95C575931CLOUD | DEV_95C5 | 7123e456-5be8-9e17-36a7-141740501936 | Cloudhost-1 | Config5 |
| 330 | 412S4E1A1CLOUD | DEV_412S | 4567123e-e85b-179e-a736-193614174050 | Cloudhost-1 | Config6 |
| 332 | 412S57931CLOUD | DEV_412S | 7123e456-5be8-9e17-36a7-141740501936 | Cloudhost-1 | Config7 |
| 334 | 673D4E1A1CLOUD | DEV_673D | 4567123e-e85b-179e-a736-193614174050 | Cloudhost-1 | Config8 |
| 336 | 673D75931CLOUD | DEV_673D | 7123e456-5be8-9e17-36a7-141740501936 | Cloudhost-1 | Config9 |

SYSTEM AND METHOD FOR CONFIGURING A SERVER DISPLAY

BACKGROUND

As the value and use of information continues to increase, organizations, such as companies, enterprises, agencies, associations, and other users, are increasingly utilizing cloud-based services and platforms. Cloud computing architectures utilize a collection of servers to provide ubiquitous, convenient, on-demand access to a shared pool of configurable cloud resources which may be accessed via a communications system such as a computer network. The resources may be hosted services that are run on one or more computing devices, such as a server. Adoption of cloud computing has been aided by the recent advances in virtualization technologies, which allows for the creation of virtual version of something, e.g., a computing resource. In cloud computing architectures and other networking systems in general, the servers may be managed from a remote device, such as a computer.

SUMMARY

This Summary is provided to introduce a selection of concepts in simplified form that are further described below in the Detailed Description. This Summary is not intended to identify key or essential features or combinations of the claimed subject matter, nor is it intended to be used to limit the scope of the claimed subject matter.

In accordance with one illustrative embodiment provided to illustrate the broader concepts, systems, and techniques described herein, a computer implemented method includes, responsive to a virtual console of a server being launched on a client device via a baseboard management controller (BMC), by the BMC, collecting one or more environment parameters of the client device and collecting one or more environmental parameters of the server. The method also includes, by the BMC, determining an appropriate display configuration for the server based on an analysis of the one or more environment parameters of the client device and the one or more environmental parameters of the server and configuring a display configuration of the server in accordance with the determined appropriate display configuration.

According to another illustrative embodiment provided to illustrate the broader concepts described herein, a system includes one or more non-transitory machine-readable mediums configured to store instructions and one or more processors configured to execute the instructions stored on the one or more non-transitory machine-readable mediums. Execution of the instructions causes the one or more processors to carry out a process including, responsive to a virtual console of a server being launched on a client device via a baseboard management controller (BMC), by the BMC, collecting one or more environment parameters of the client device and one or more environmental parameters of the server. The process also includes, by the BMC, determining an appropriate display configuration for the server based on an analysis of the one or more environment parameters of the client device and the one or more environmental parameters of the server and configuring a display configuration of the server in accordance with the determined appropriate display configuration.

In some embodiments, wherein the one or more environmental parameters of the client device includes information regarding at least one of an installed operating system (OS), a display, or a display configuration setting.

In some embodiments, wherein the one or more environmental parameters of the server includes information regarding at least one of an installed operating system (OS), a display, or video capabilities.

In some embodiments, wherein the analysis of the one or more environment parameters of the client device and the one or more environmental parameters of the server is using a machine learning (ML) model. In one aspect, the ML model includes an ensemble model.

In some embodiments, wherein the appropriate display configuration for the server is a previously created server display configuration.

In some embodiments, wherein determining an appropriate display configuration for the server includes creating a server display configuration, and the method/process further includes, responsive to successfully configuring the display configuration of the server in accordance with the created server display configuration, storing, by the BMC, the created server display configuration in a display configuration repository.

In some embodiments, the method/process further includes, responsive to the virtual console of the server being launched on the client device via the BMC, by the BMC, determining whether a previously created server display configuration exists for the launch of the virtual console of the server and, responsive to a determination that the previously created server display configuration exists, configuring the display configuration of the server in accordance with the previously created display configuration.

According to another illustrative embodiment provided to illustrate the broader concepts described herein, a computer implemented method includes, responsive to a virtual console of a server being launched on a client device via a baseboard management controller (BMC), by the BMC, collecting one or more environment parameters of the client device and collecting one or more environmental parameters of the server. The method also includes, by the BMC, determining whether a previously created server display configuration exists based on the one or more environment parameters of the client device and the one or more environmental parameters of the server and, responsive to a determination that the previously created server display configuration exists, configuring a display configuration of the server in accordance with the previously created server display configuration.

According to another illustrative embodiment provided to illustrate the broader concepts described herein, a system includes one or more non-transitory machine-readable mediums configured to store instructions and one or more processors configured to execute the instructions stored on the one or more non-transitory machine-readable mediums. Execution of the instructions causes the one or more processors to carry out a process including, responsive to a virtual console of a server being launched on a client device via a baseboard management controller (BMC), by the BMC, collecting one or more environment parameters of the client device and collecting one or more environmental parameters of the server. The process also includes, by the BMC, determining whether a previously created server display configuration exists based on the one or more environment parameters of the client device and the one or more environmental parameters of the server and, responsive to a determination that the previously created server display configuration exists, configuring a display configuration of the server in accordance with the previously created server display configuration.

In some embodiments, the method/process further includes, responsive to a determination that a previously created server display configuration does not exist, by the BMC, determining an appropriate display configuration for the server based on an analysis of the one or more environment parameters of the client device and the one or more environmental parameters of the server and configuring a display configuration of the server in accordance with the determined appropriate display configuration.

In some embodiments, the method/process further includes, responsive to a successful configuration of the display configuration of the server in accordance with the determined appropriate server display configuration, storing the determined appropriate server display configuration in a display configuration repository.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

Server devices may be provided with a Baseboard Management Controller (BMC) (also known as a management controller) in order to enable remote management of the servers. A BMC of a server device may be implemented as a chip embedded in the server device (e.g., implemented as a microcontroller on a main circuit board or expansion card in the server device). One example of a BMC may be the Integrated DELL Remote Access Controller (iDRAC) available from DELL Inc. of Round Rock, Tex., United States. Other examples of BMCs include Fujitsu's remote management card iRMC, HP integrated Lights-Out (iLO), Sun integration Lights Out Management (ILOM), and IBM Remote Supervisor Adapter II (RSA II). In any case, the BMC may be communicably coupled to an operating system (OS) of the server device via an OS-to-BMC interface that extends between the BMC and a processing system that provides the OS on the server device. In some implementations, the OS-to-BMC interface may be provided by a Universal Serial Bus (USB) Network Interface Controller (NIC) interface. For example, in the case iDRAC, the USB NIC interface may be sometimes referred to as an OS-to-iDRAC passthrough channel, which may provide for high-speed bi-directional communication between the iDRAC and OS. The BMC may monitor and communicate (e.g., report) system parameters, including the power state of the server, temperatures inside the server, hardware error conditions, OS settings and functions, and other operating information.

A BMC may be operable to provide management functionality for the secure remote management of servers (e.g., server instances) on the computing device. Such management may be provided by the BMC even if the computing device is powered off or powered to a standby state. To do so, the BMC may provide a virtual console interface that can be used to access the management functionality. For example, a user, such as a datacenter administrator, may use a virtual console of a server via the BMC (e.g., via the BMC virtual console interface) to remotely manage the server, storage, networking, and/or other devices on the computing device. However, when a virtual console of a server is launched on a client device, such as a client display device, using the BMC, oftentimes the quality of the display of the virtual console on the client device may be poor. For example, the virtual console displayed on the client display device may be poor and not of optimal display quality due to a mismatch and/or incompatibility between display configurations, hardware capabilities, software, etc. between the client device and the server. As a result, the user may need to appropriately configure the display resolution and other display configuration parameters for the server which was launched using the BMC in order to obtain an improved display of the virtual console (e.g., to get a higher quality display of the virtual console on the client device). Determining or identifying an appropriate display configuration (e.g., determining appropriate values for the display configuration parameters) for the server may be challenging (e.g., may not be trivial). In addition, a datacenter administrator may be monitoring several servers, and in some cases many servers in a datacenter. When the administrator launches a virtual console of a server via a BMC, the administrator needs to identify an appropriate display configuration and appropriately configure the display configuration parameter settings for the server which has been launched using the BMC. The challenge is compounded in cases where the administrator accesses the servers using various client devices, and in large datacenters where multiple administrators may access many servers using various client devices.

Figure 1:
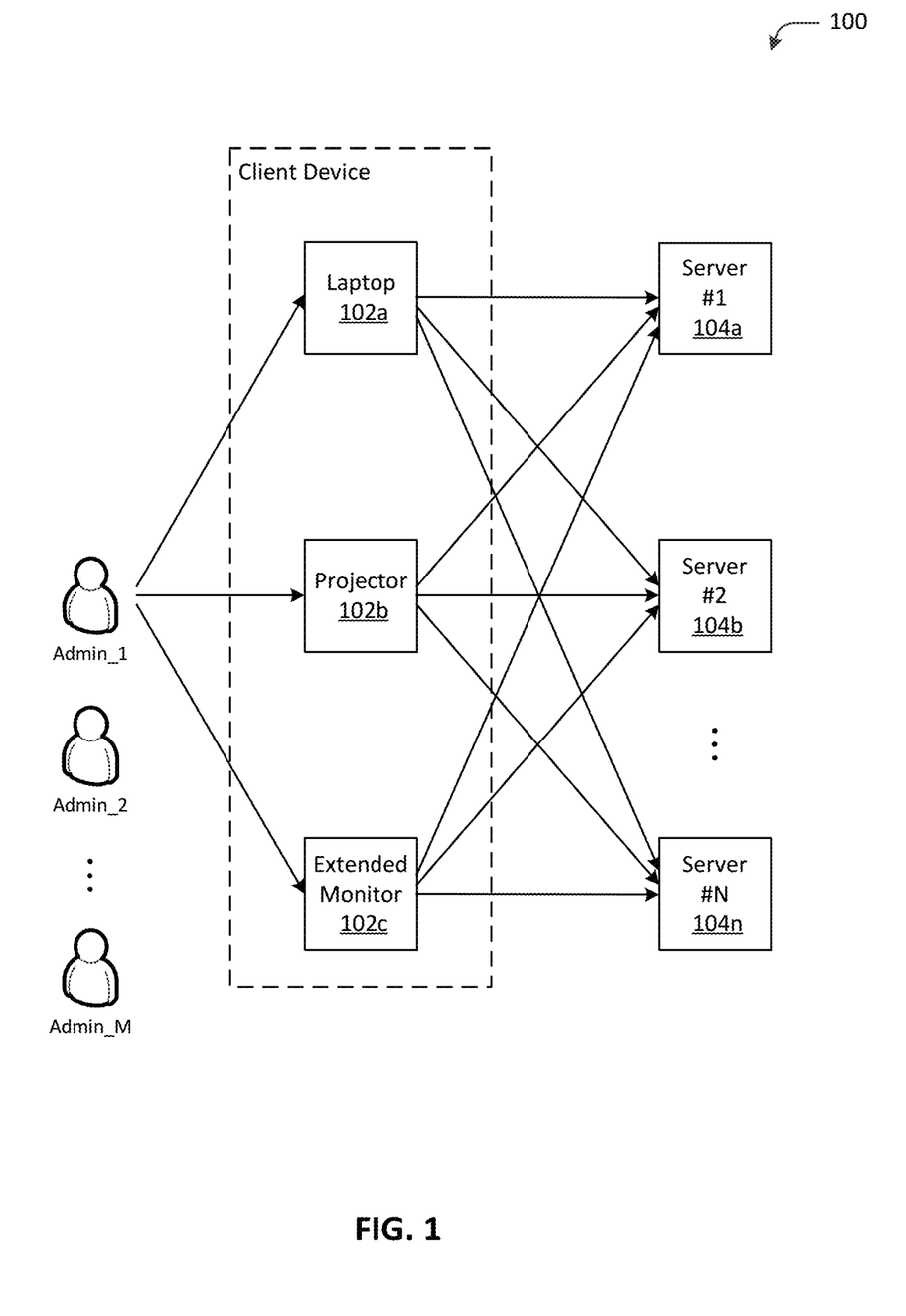
FIG. 1 is an illustrative diagram of multiple administrators accessing multiple servers in a datacenter using various client devices.

FIG. 1 shows an example where multiple datacenter administrators may access multiple servers in a datacenter using various client devices. In the example shown, over a given duration, a datacenter administrator (e.g., "Admin_1") may access the various servers in the datacenter (e.g., server 104a-server 104n) using various client devices, such as a laptop 102a, a projector 102b, and an extended monitor 102c. In this case, there may be 3N (i.e., 3 client devices×N servers) number of different possible display configurations that Admin_1 may have to perform to obtain a suitable quality display of a virtual console on a client device. For example, when Admin_1 launches a virtual console of server 104a on laptop 102a using the BMC, Admin_1 may need to appropriately configure the display configuration parameters of server 104a to obtain a desired virtual console display quality on laptop 102a. When Admin_1 subsequently launches a virtual console of server 104a on another client device different from laptop 102a (e.g., projector 102*b*) using the BMC, Admin_1 may need to appropriately configure the display configuration parameters of server 104*a* to obtain a desired virtual console display quality on projector 102*b* (e.g., Admin_1 may need to reconfigure the display configuration parameters of server 104*a*). Continuing the example of Admin_1 and server 104*a*, when Admin_1 subsequently launches a virtual console of server 104*a* on another client device different from projector 102*b* (e.g., laptop 102*a* or extended monitor 102*c*) using the BMC, Admin_1 may need to again appropriately configure the display configuration parameters of server 104*a* to obtain a desired virtual console display quality on the different client device. In the example of FIG. 1, each of the other datacenter administrators (e.g., "Admin_2" to "Admin_M") may similarly access the same servers in the datacenter (e.g., server 104*a*-server 104*n*) or a number of different servers in the datacenter using the same client devices (e.g., laptop 102*a*, projector 102*b*, and extended monitor 102*c*) or a number of different client devices. Each time an administrator launches a virtual console of a particular server on any one of the client devices using the BMC, the administrator may need to appropriately configure the display configuration parameters of the launched server to obtain a desired virtual console display quality on the client device used to launch that server. Note how the number of display configurations that may be performed by the administrators is based on the number of administrators, the number of client devices used by the administrators to manage the servers, and the number of servers. As a result, in datacenters with a large number of administrators who use a number of different client devices to access a large number of servers, the number of display configurations that may be performed by the administrators may be significant.

Certain embodiments of the concepts, techniques, and structures disclosed herein are directed to intelligent alignment of a server display configuration to an environment of a client device that is used to launch a virtual console of the server. In some embodiments, intelligent alignment of the server display configuration may be achieved by analyzing environmental parameters of the server and environmental parameters of the client device. Based on the analysis of the environmental parameters of the server and the client device, an appropriate display configuration for the server which produces a quality display of the virtual console on the client device may be determined. For example, when a user, such as a datacenter administrator, uses a client device to launch a virtual console of a server using the BMC, the environmental parameters of the client device and the environmental parameters of server may be collected and analyzed to determine an appropriate display configuration for the server which produces a quality display of the virtual console on the client device. The display configuration parameters of the server can be appropriately configured based on the determined appropriate display configuration for the server to produce an improved and quality display of the virtual console on the client device. In some embodiments, the analysis of the environmental parameters of the server and the client device may be performed using a learning algorithm (e.g., a classification tree algorithm or other suitable classification algorithm) that is trained using machine learning techniques to predict an appropriate server display configuration. In one such embodiment, the learning technique may include an ensemble learning technique that uses multiple learning algorithms.

In the description of the implementations that follow, although certain specific embodiments and examples make reference to particular brands and names of products (e.g., Dell EMC products, iDRAC, iDRAC Service Module (iSM), OS-to-iDRAC passthrough channel, SupportAssist, etc.), it will be appreciated in light of this disclosure that such embodiments and examples are not limited or restricted in application to the details of implementation in conjunction with the particular brands and names of products. Rather, one of ordinary skill in the art will recognize that the concepts, devices, systems, and techniques are capable of implementation using products provided by other vendors and implementation in a BMC/management controller in general. Further, examples of specific implementations are provided herein for illustrative purposes only and are not intended to be limiting. The acts components, elements, and features discussed in conjunction with any one or more examples are not intended to be excluded from a similar role in any other examples. By way of only one example, although certain concepts and techniques disclosed herein describe the OS-to-BMC interface as a USB NIC interface, one of skill in the art will recognize that the OS-to-B MC interface may be provided by other components and/or in other manners in light of the present disclosure.

Figure 2:
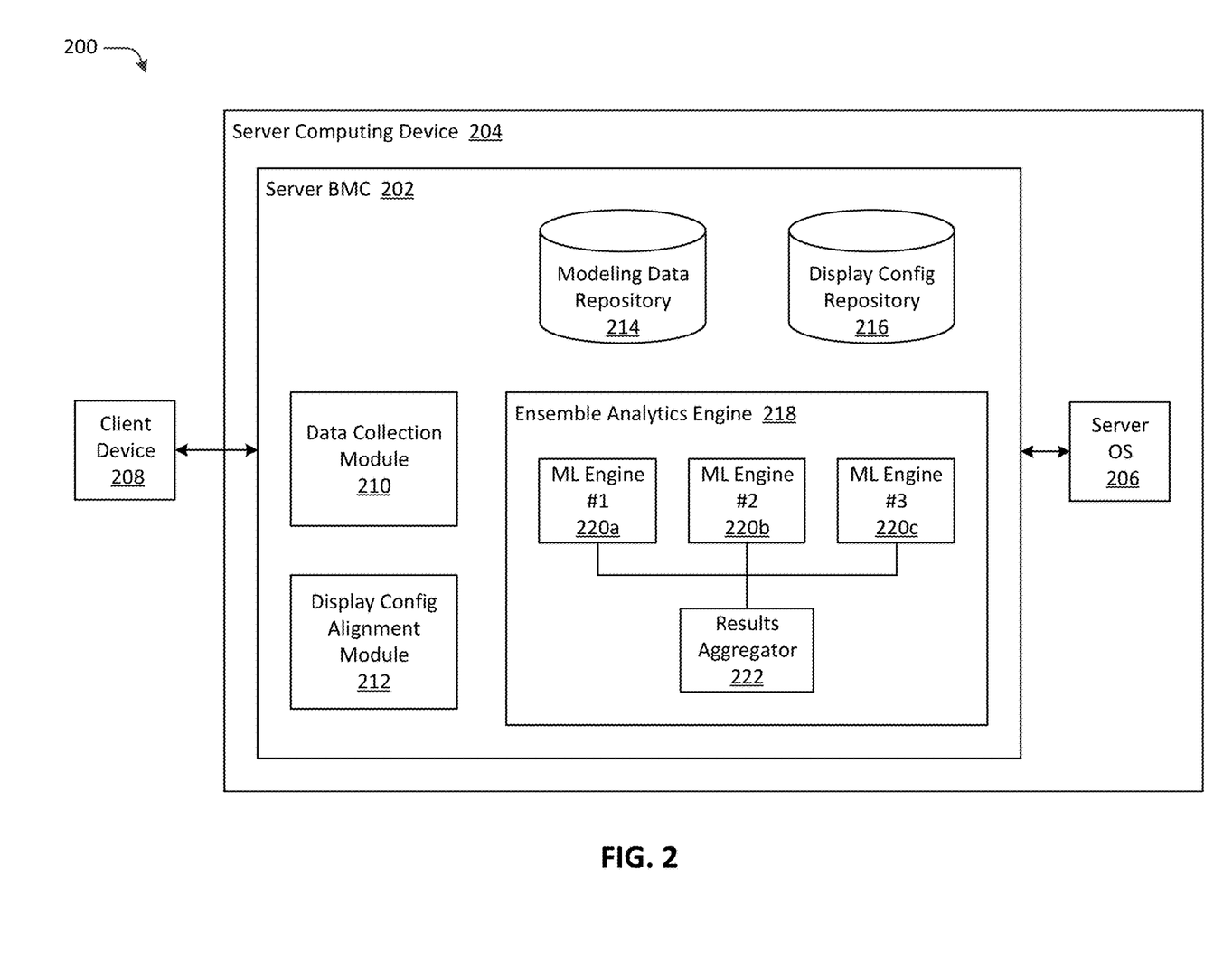
FIG. 2 shows an illustrative systems architecture for intelligent server display configuration, in accordance with an embodiment of the present disclosure.

Referring now to FIG. 2, shown is an illustrative systems architecture 200 for intelligent server display configuration, in accordance with an embodiment of the present disclosure. As shown, systems architecture 200 includes a server BMC 202 installed on a server computing device 204 and configured to communicate with a server OS 206 on server computing device 204. Server computing device 204 can include various other hardware and software components which, for the sake of clarity, are not shown in FIG. 2.

Server BMC 202 is operable to facilitate remote management of one or more servers (e.g., server instances) on server computing device 204. For example, in one embodiment, server BMC 202 may be or include an iDRAC. As described previously, server BMC 202 may provide a virtual console interface that can be used to launch a virtual console which can be used to remotely manage the elements of server computing device 204. To this end, the virtual console may provide a graphical user interface (GUI) and/or a command line interface (CLI) which can be used to access the management functionality provided by server BMC 202. In some embodiments, when a virtual console of a server is launched on a client device (e.g., a client device 208) via server BMC 202, server BMC 202 is operable to align the server display configuration to an environment of the client device. Aligning the display configuration of the server to the client device environment provides a quality display of the virtual console of the server on the client device. In such embodiments, as can be seen in FIG. 2, server BMC 202 includes a data collection module 210, a display configuration alignment module 212, a modeling data repository 214, a display configuration repository 216, and an ensemble analytics engine 218.

It is appreciated that server BMC 202 may not include certain of the components depicted in FIG. 2. For example, in certain embodiments, server BMC 202 may not include data collection module 202 and/or modeling data repository 214. As another example, in some embodiments, server BMC 202 may not include display configuration repository 216. In some such embodiments, some or all of the functionality provided by the excluded components may be provided by one or more of the included components of server BMC 202 or provided by one or more components/systems that are external to server BMC 202. Thus, it should be appreciated that numerous configurations of server BMC 202 can be implemented and the present disclosure is not intended to be limited to any particular one.

To promote clarity in the drawings, FIG. 2 shows a single server OS 206 and a single client device 208 each communicably coupled to server BMC 202. However, embodiments of server BMC 202 can be used to service many client devices 208 used by one or more different users to access and remotely manage one or more servers (e.g., server OSes 206). The various components of server BMC 202 may be implemented as computer instructions executable to perform the corresponding functions disclosed herein.

Referring to server BMC 202, data collection module 210 is operable to collect or otherwise retrieve vendor recommended display configuration information and other display configuration materials from one or more data sources. The data sources may include, for example, product configuration manuals/guides and product user manuals/guides on product vendor websites. For example, a computing device vendor such as DELL, may provide on their website product configuration manuals/guides that specify recommended server display configurations for servers run on their various computing devices and various configurations of the computing devices. As another example, a display device vendor such as NVIDIA, may provide on their website product configuration manuals/guides that specify recommended display configurations for their display devices, monitors, GPUs, and other products. As still another example, an OS vendor such as MICROSOFT, may provide on their website user manuals/guides that specify recommended display configurations for their various OSes and various versions of the OSes.

Data collection module 210 may utilize application programming interfaces (APIs) provided by the various data sources to collect information therefrom. For example, a product vendor website my provide an API, such as a REST-based API, a Web API, or other suitable API, which may be used to collect information therefrom. In cases where a website does not provide an API, other means, such as printing and/or imaging, may be utilized to collect the information from the website (e.g., generate an image of the product manual pages on the vendor website). Optical character recognition (OCR) technology can then be used to convert the image of the content to textual data. In some embodiments, data collection module 210 can collect information from the various data sources on a continuous or periodic basis.

Data collection module 210 can use the vendor recommended display configuration information and other display configuration materials collected from the various data sources to generate a modeling dataset for training a learning algorithm (e.g., a classification tree algorithm or other suitable classification algorithm) using machine learning techniques to predict an appropriate server display configuration for a virtual console of a server launched on a client device (e.g., client device 208). For example, as will be further described below, the modeling dataset may be used to train multiple classification algorithms (e.g., multiple classification tree algorithms or other suitable classification algorithms) for ensemble analytics engine 218.

To generate a modeling dataset for training the classification algorithms (e.g., the classification tree algorithms) of ensemble analytics engine 218, data collection module 210 may utilize natural language processing (NLP) algorithms and techniques to preprocess the collected text data (e.g., the information contained in the product configuration manuals/guides, product user manuals/guides, and product display configuration materials collected from the various data sources). For example, the data preprocessing may include tokenization (e.g., splitting a phrase, sentence, paragraph, or an entire text document into smaller units, such as individual words or terms), noise removal (e.g., removing whitespaces, characters, digits, and items of text which can interfere with the extraction of features from the data), stopwords removal, stemming, and/or lemmatization. The data preprocessing may also include placing the data into a tabular format. In the table of vendor recommended product display configurations, the structured columns represent the features (also called variables) and each row represents an observation or instance (e.g., a particular display configuration for a product, a configuration of a product, or a combination of products and/or a combination of configurations of products). Thus, each column in the table shows a different feature of the instance. The preliminary operations may also include feature extraction and/or feature selection to determine the relevant or important features from the noisy data and to reduce the dimension and complexity of the trained model, hence improving its accuracy and performance. The important/relevant features are the features that are more correlated with the thing being predicted by the trained model (e.g., a display configuration for a product). The data preprocessing may also include placing the data (information) in the table into a format that is suitable for training a model. For example, since machine learning deals with numerical values, textual categorical values (i.e., free text) in the columns can be converted (i.e., encoded) into numerical values using techniques such as label encoding or one-hot encoding.

In some embodiments, tests may be performed to validate each instance in the table of vendor recommended product display configurations (e.g., tests may be performed to validate the individual display configurations specified in the table). These validation tests may be performed by the provider of server BMC 202, such as DELL EMC, for example. For example, the validation tests may be performed by a testing unit/team within DELL EMC. For a particular display configuration, a validation test result may be a numerical value that indicates the quality of the virtual console display generated by that display configuration. For example, the value may be from "1" to "5" where "1" indicates the lowest or poorest quality and "5" indicates the highest or optimal quality. The table of vendor recommended product display configurations and the corresponding validation test results for the various server display configurations in the table may be used to generate the modeling dataset.

Note that a classification tree algorithm, and classification algorithms in general, is a nonparametric and instance-based learning algorithm, meaning that the classification tree algorithm does not make any assumptions on the underlying data and doesn't explicitly learn a model. Instead, the classification tree algorithm memorizes the training instances which are subsequently used as knowledge for the prediction phase. That is, the training phase of the classification tree algorithm comprises only of storing the modeling dataset (e.g., storing the table of vendor recommended server display configurations and the corresponding validation test results). Data collection module 210 can store the generated modeling dataset for the classification algorithms (e.g., the classification tree algorithms) of ensemble analytics engine 218 in modeling data repository 214.

In some embodiments, data collection module 210 can collect the environmental parameters of a client device and a server for use in aligning the server display configuration to the environment of the client device. For example, in response to a virtual console of a server corresponding to server OS 206 being launched on client device 208 via server BMC 202, data collection module 210 can connect to client device 208 and collect the environment parameters of client device 208. For example, data collection module 210 may connect to and collect the necessary environmental parameters from client device 208 using a USB NIC or other suitable communication channel established with client device 208 (e.g., using the OS-to-iDRAC passthrough channel connection established with client device 208). Non-limiting examples of environmental parameters that can be collected from client device 208 include information regarding the OS installed the client device (e.g., type of OS, OS version, date of install, etc.), information regarding the display (e.g., type of display, type of video driver, video driver version, type of video controller, video controller version, etc.), and information regarding the display configuration settings (e.g., resolution, refresh rate, color format, etc.). Similarly, data collection module 210 collect the environment parameters of the server. In one embodiment, upon completion of the install of server OS 206 on the server, data collection module 210 may collect the necessary environmental parameters, such as information regarding server OS 206 (e.g., type of OS, OS version, date of install, etc.) and information regarding the server display configuration settings (e.g., resolution, refresh rate, color format, etc.), from server OS 206 using a USB NIC, iSM, SupportAssist, or other suitable communication channel (e.g., using the OS-to-iDRAC passthrough channel to server OS 206). Data collection module 210 can also collect other server environmental parameters, such as the video capabilities of the server (e.g., installed Video Graphics Array (VGA), graphics processing unit (GPU), video drivers, etc.). Some of the server environmental parameters may be collected from server computing device 204. Data collection module 210 can then send a request to align a server display configuration to an environment of a client device to display configuration alignment module 212 along with the collected environmental parameters of client device 208 and the server corresponding to server OS 206.

In some embodiments, data collection module 210 may detect the virtual console of the server corresponding to server OS 206 being launched on client device 208 via server BMC 202. In other embodiments, data collection module 210 may receive a notification of the virtual console of the server corresponding to server OS 206 being launched on client device 208 via server BMC 202. For example, another component of server BMC 202, such as the virtual console interface, may detect the launching of the virtual console of the server and send or otherwise provide a notification to data collection module 210.

Display configuration alignment module 212 can, in response to receiving the request to align the server display configuration to the environment of the client device, check to determine whether a previously created server display configuration exists for client device 208, the server corresponding to server OS 206, and a user (e.g., an administrator) who is using client device 208 to launch the virtual console of the server. In one embodiment, the previously created server display configurations may be stored in display configuration 216. For example, as will be further described below, upon determining an appropriate server display configuration, ensemble analytics engine 218 may store the created server display configuration in display configuration repository 216.

Referring again to display configuration alignment module 212, in response to identifying a previously created server display configuration in display configuration repository 216, display configuration alignment module 212 can retrieve the previously created server display configuration and appropriately configure the display configuration of the server corresponding to server OS 206 in accordance with the previously created server display configuration. In other words, the display configuration parameter settings of server OS 206 may be appropriately configured based on the previously created server display configuration. The previously created server display configuration is a display configuration which produces a quality display of the virtual console of the server corresponding to server OS 206 on client device 208. Otherwise (i.e., an appropriate previously created server display configuration is not found), display configuration alignment module 212 can send a request to align the server display configuration to ensemble analytics engine 218 along with the collected environmental parameters of client device 208 and the server corresponding to server OS 206. That is, since a server display configuration was not previously created for client device 208, the server corresponding to server OS 206, and the user, a request is sent to ensemble analytics engine 218 to determine an appropriate display configuration for server OS 206 which produces a quality display of the virtual console on client device 208.

Ensemble analytics engine 218 can, in response to receiving a request to align the server display configuration, determine an appropriate server display configuration for a server (e.g., an appropriate display configuration for server OS 206). The determined server display configuration is a display configuration for the server which produces a quality display of a virtual console of the server on a client device. To this end, in some embodiments, ensemble analytics engine 218 can implement a learning algorithm, such as a classification tree algorithm or other suitable classification algorithm, to predict (i.e., determine) an appropriate server display configuration. In one such embodiment, ensemble analytics engine 218 may employ an ensemble learning technique that uses multiple learning algorithms (e.g., multiple classification tree algorithms or other suitable classification algorithms) together to predict an appropriate server display configuration. Such embodiments recognize that using multiple machine learning (ML) algorithms together may produce a better prediction when compared with a prediction made using a single ML algorithm. An ensemble model is based upon the constituent ML algorithms used to generate the ensemble model. In the ensemble model, each constituent ML algorithm may be trained using a subset of the modeling dataset and used to predict a server display configuration based on the subset of the modeling dataset used to train the particular constituent ML algorithm. The predictions made by the constituent ML algorithms may then be combined to generate a final server display configuration (e.g., the ensemble model may predict a server display configuration by algorithmically combining the server display configurations predicted by the constituent ML algorithms).

In one embodiment, as can be seen in FIG. 2, ensemble analytics engine 216 includes three (3) ML engines 220a, 220b, 220c and a results aggregator 222. In the example of FIG. 2, ML engine 220a may correspond to a first constituent ML algorithm, ML engine 220b may correspond to a second constituent ML algorithm, and ML engine 220a may correspond to a third constituent ML algorithm of the ensemble model of ensemble analytics engine 218. ML engine 220a may be trained using a subset of the modeling dataset that is based on the display configuration of the client device. Once trained, ML engine 220a can be used to predict a server display configuration that is based on the subset of the modeling dataset that was used to train ML engine 220*a* (e.g., ML engine 220*a* can predict a server display configuration in response to an input of the subset of the modeling dataset that is based on the display configuration of the client device and an input of a feature vector representing a display configuration on client device 208).

ML engine 220*b* may be trained using a subset of the modeling dataset that is based on the OS installed on the server and the OS installed on the client device. Once trained, ML engine 220*b* can be used to predict a server display configuration that is based on the subset of the modeling dataset that was used to train ML engine 220*b* (e.g., ML engine 220*c* can predict a server display configuration in response to an input of the subset of the modeling dataset that is based on the OS installed on the server and the OS installed on the client device, and an input of a feature vector representing server OS 206 and the OS installed on client device 208).

ML engine 220*c* may be trained using a subset of the modeling dataset that is based on the video capabilities of the server. Once trained, ML engine 220*c* can be used to predict a server display configuration that is based on the subset of the modeling dataset that was used to train ML engine 220*c* (e.g., ML engine 220*c* can predict a server display configuration in response to an input of the subset of the modeling dataset that is based on the video capabilities of the server and a feature vector representing the video capabilities of the server corresponding to server OS 206).

Results aggregator 222 is operable generate a final prediction based on the individual predictions of a server display configuration generated by ML engines 220*a*, 220*b*, 220*c*. For example, in one embodiment, results aggregator 222 can algorithmically combine the individual server display configurations predicted by ML engines 220*a*, 220*b*, 220*c* to create a final server display configuration (e.g., algorithmically combine the individual predictions from ML engines 220*a*, 220*b*, 220*c* to generate a final prediction of a server display configuration). Upon creating a final server display configuration, results aggregator 222 can appropriately configure the display configuration of the server corresponding to server OS 206 in accordance with the final server display configuration. Upon successfully configuring the display configuration of the server, results aggregator 222 can store the final server display configuration that was used to configure the display configuration of the server in display configuration repository 216. The created server display configuration is a server display configuration that is appropriate for client device 208, the server corresponding to server OS 206, and the user (e.g., an administrator) who is using client device 208 to launch the virtual console of the server, and can be subsequently used when this user uses client device 208 to launch a virtual console of the server corresponding to server OS 206 via server BMC 202.

In some cases, results aggregator 222 may not be able to successfully configure the display configuration of the server corresponding to server OS 206 in accordance with the final server display configuration. For example, the final server display configuration may specify a value for s display configuration parameter, such as a display resolution, which is not supported by server OS 206. In such cases, results aggregator 222 can generate a second final prediction based on the individual predictions of a server display configuration generated by ML engines 220*a*, 220*b*, 220*c* (e.g., generate a second final server display configuration). Results aggregator 222 can then appropriately configure the display configuration of the server corresponding to server OS 206 in accordance with the second final server display configuration. In some embodiments, results aggregator 222 may aggregate a different combination of predictions from ML engines 220*a*, 220*b*, 220*c* to generate a second final prediction.

While only three (3) constituent ML algorithms (e.g., ML engines 220*a*, 220*b*, 220*c*) are illustrated in the example of FIG. 2 for purposes of clarity, it will be appreciated in light of this disclosure that other embodiments of the ensemble model may include a different number of constituent ML algorithms such as, for example, two (2) constituent ML algorithms, four (4) constituent ML algorithms, or any other suitable number of constituent ML algorithms. For example, the number of constituent ML algorithms may be based or dependent on the size of the modeling dataset, the types of features in the modeling dataset, groupings of the features, and/or identification of additional or new features/parameters that influence the prediction of a server display configuration. Also, additional ML algorithms may be added to an already generated ensemble model (e.g., ensemble analytics engine 218) as new features/parameters that influence the prediction of a server display configuration are identified.

Figure 3:
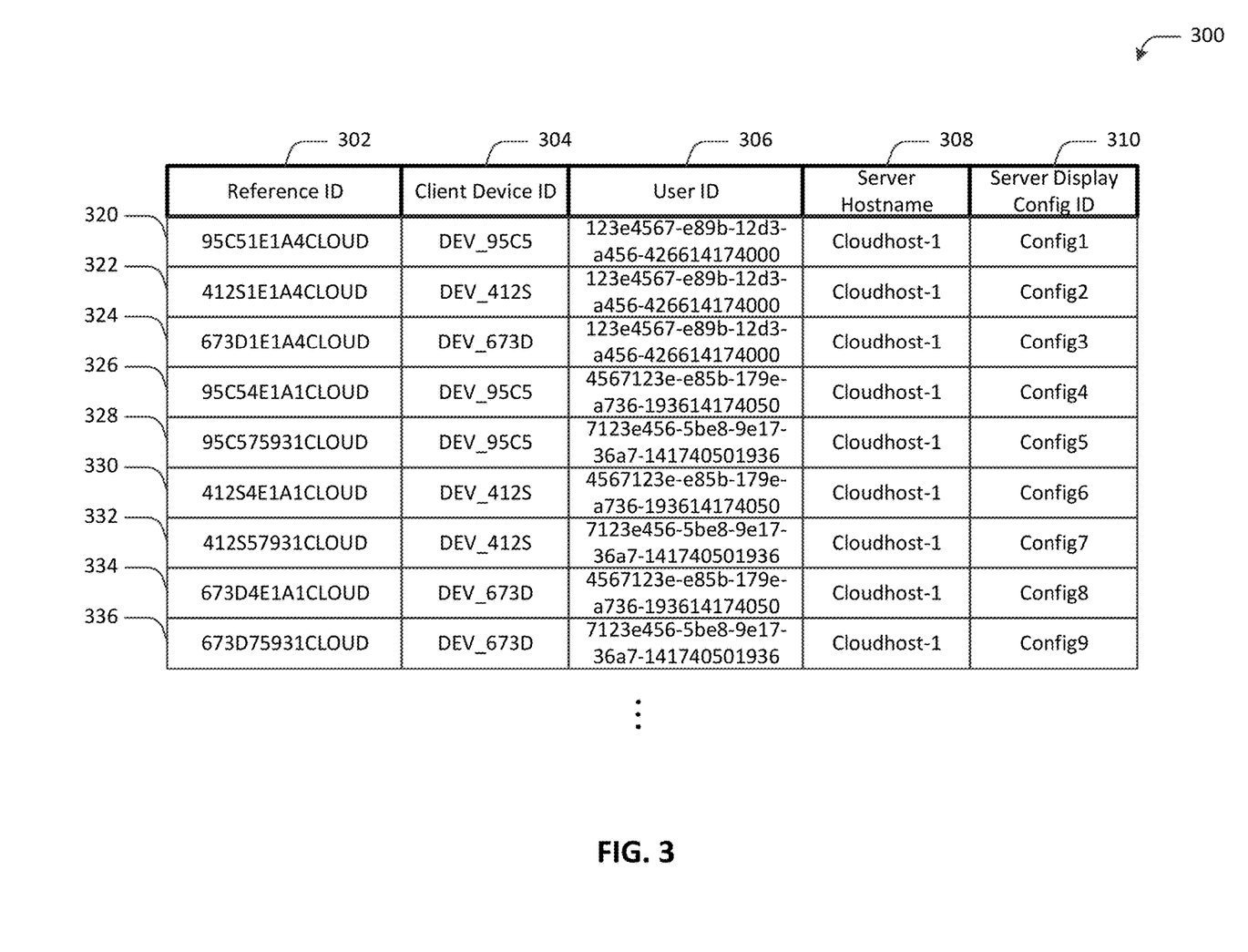
FIG. 3 is a diagram illustrating a portion of a data structure that can be used to store previously created server display configurations, in accordance with an embodiment of the present disclosure.

Turning to FIG. 3 and with continued reference to FIG. 2, illustrated is a portion of a data structure 300 that can be used to store previously created server display configurations, in accordance with an embodiment of the present disclosure. Illustrative data structure 300 includes one or more records, wherein each record stores information about a previously created server display configuration. In the example shown, data structure 300 includes the following attributes (or "columns"): a reference identifier 302 ("Reference ID"), a client device identifier 304 ("Client Device ID"), a user identifier 306 ("User ID"), a server hostname 308 ("Server Hostname"), and a server display configuration identifier 310 ("Server Display Config ID"). The Reference ID attribute may correspond to a unique identifier of data structure 300, the Client Device ID attribute may correspond to a unique identifier of a client device, the User ID attribute may correspond to a unique identifier of a user who is launching a virtual console of a server, the Server Hostname attribute may correspond to a hostname of a server, and the Server Display Config ID attribute may correspond to a unique identifier of a server display configuration (e.g., a server display configuration created by ensemble analytics engine 218).

For example, and as shown in FIG. 3 a first entry (or "row") in data structure 300 is for a Reference ID "95C51E1A4CLOUD" that identifies a record 320, a second entry in data structure 300 is for a Reference ID "412S1E1A4CLOUD" that identifies a record 322, a third entry in data structure 300 is for a Reference ID "673D1E1A4CLOUD" that identifies a record 324, a fourth entry in data structure 300 is for a Reference ID "95C54E1A1CLOUD" that identifies a record 326, a fifth entry in data structure 300 is for a Reference ID "95C575931CLOUD" that identifies a record 328, a sixth entry in data structure 300 is for a Reference ID "412S4E1A1CLOUD" that identifies a record 330, a seventh entry in data structure 300 is for a Reference ID "412S57931CLOUD" that identifies a record 332, an eighth entry in data structure 300 is for a Reference ID "673D4E1A1CLOUD" that identifies a record 334, and a ninth entry in data structure 300 is for a Reference ID "673D75931CLOUD" that identifies a record 336.

Still referring to the example of FIG. 3, record 320 corresponds to a server display configuration identified as "Config1", which was created for a user identified as "123e4567-e89b-12d3-a456-426614174000" using a client device identified as "DEV_95C5" to launch a virtual console of a server identified as "Cloudhost-1" via server BMC 202. Record 322 corresponds to a server display configuration identified as "Config2", which was created for a user identified as "123e4567-e89b-12d3-a456-426614174000" using a client device identified as "DEV_412S" to launch a virtual console of a server identified as "Cloudhost-1" via server BMC 202. Record 324 corresponds to a server display configuration identified as "Config3", which was created for a user identified as "123e4567-e89b-12d3-a456-426614174000" using a client device identified as "DEV_673D" to launch a virtual console of a server identified as "Cloudhost-1" via server BMC 202. Record 326 corresponds to a server display configuration identified as "Config4", which was created for a user identified as "4567123e-e85b-179e-a736-193614174050" using a client device identified as "DEV_95C5" to launch a virtual console of a server identified as "Cloudhost-1" via server BMC 202. Record 328 corresponds to a server display configuration identified as "Config5", which was created for a user identified as "7123e456-5be8-9e17-36a7-141740501936" using a client device identified as "DEV_95C5" to launch a virtual console of a server identified as "Cloudhost-1" via server BMC 202. Record 330 corresponds to a server display configuration identified as "Config6", which was created for a user identified as "4567123e-e85b-179e-a736-193614174050" using a client device identified as "DEV_412S" to launch a virtual console of a server identified as "Cloudhost-1" via server BMC 202. Record 332 corresponds to a server display configuration identified as "Config7", which was created for a user identified as "7123e456-5be8-9e17-36a7-141740501936" using a client device identified as "DEV_412S" to launch a virtual console of a server identified as "Cloudhost-1" via server BMC 202. Record 334 corresponds to a server display configuration identified as "Config8", which was created for a user identified as "4567123e-e85b-179e-a736-193614174050" using a client device identified as "DEV_673D" to launch a virtual console of a server identified as "Cloudhost-1" via server BMC 202. Record 336 corresponds to a server display configuration identified as "Config9", which was created for a user identified as "7123e456-5be8-9e17-36a7-141740501936" using a client device identified as "DEV_673D" to launch a virtual console of a server identified as "Cloudhost-1" via server BMC 202.

Based on the records in data structure 300, if a user having a user identifier 123e4567-e89b-12d3-a456-426614174000 subsequently uses a client device having an identifier DEV_95C5 to launch a virtual console of a server having an identifier Cloudhost-1 via server BMC 202, display configuration alignment module 212 can identify the server display configuration having an identifier Config1 as an appropriate server display configuration. Display configuration alignment module 212 can then appropriately configure the display configuration of the server (i.e., the server identified as Cloudhost-1) in accordance with the identified previously created server display configuration (i.e., with the server display configuration identified as Config1).

Figure 4:
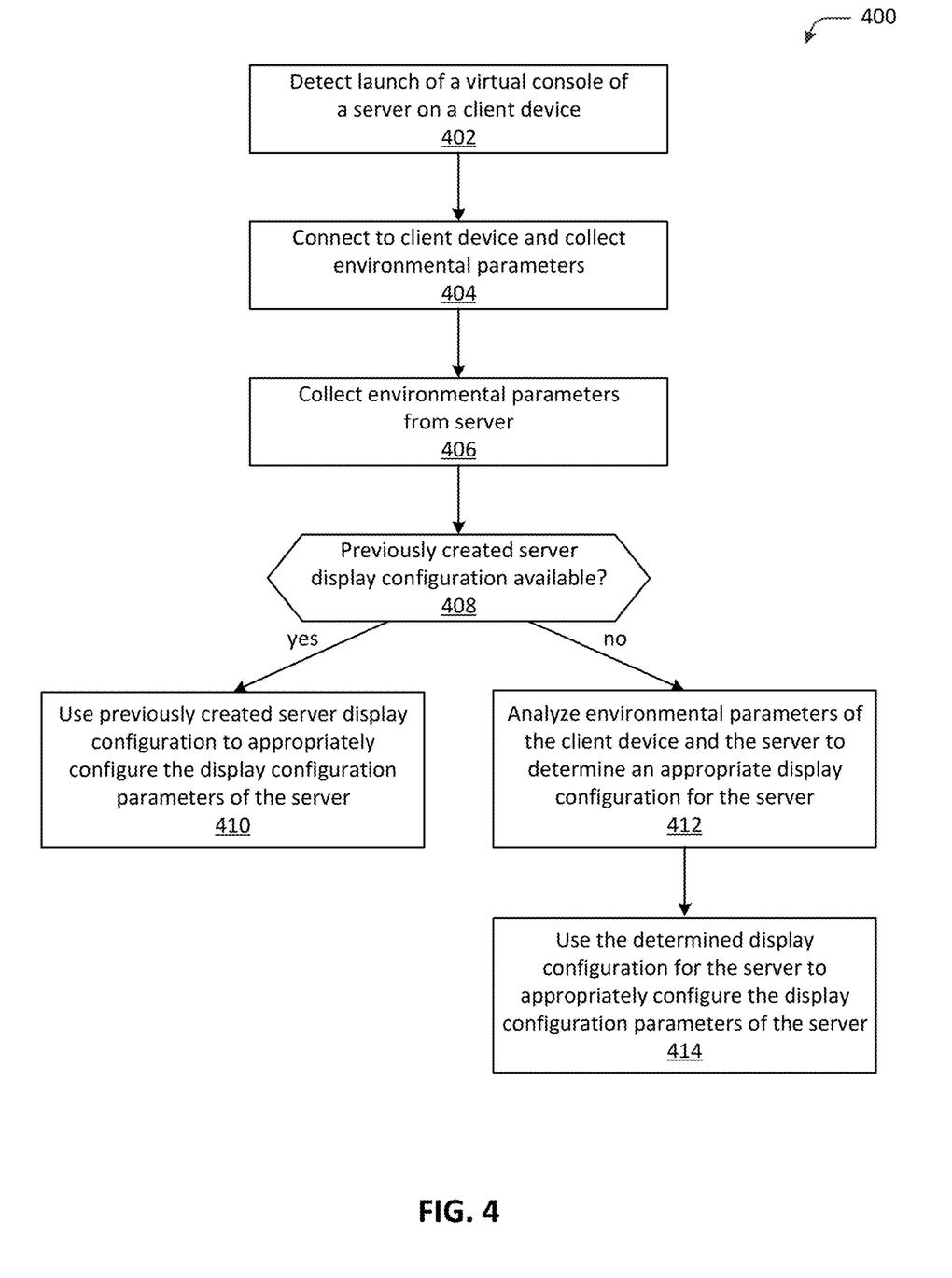
FIG. 4 is a flow diagram of an example process for aligning a display configuration of a server to an environment of a client device, in accordance with an embodiment of the present disclosure.

FIG. 4 is a flow diagram of an example process 400 for aligning a display configuration of a server to an environment of a client device, in accordance with an embodiment of the present disclosure. Process 400 may be implemented or performed by any suitable hardware, or combination of hardware and software, including without limitation the components of systems architecture 200 shown and described with respect to FIG. 2, the computing device shown and described with respect to FIG. 5, or a combination thereof. For example, in some embodiments, the operations, functions, or actions illustrated in process 400 may be performed, for example, in whole or in part by data collection module 210, display configuration alignment module 212, and ensemble analytics engine 218, or any combination of these including other components of systems architecture 200 described with respect to FIG. 2.

With reference to process 400 of FIG. 4, and in an illustrative use case, at 402, a launch of a virtual console of a server on a client device via a BMC may be detected. For example, data collection module 210 may detect or receive notification when a user (e.g., an administrator) uses client device 208 to launch a virtual console of a server (e.g., a server corresponding to server OS 206) via server BMC 202.

At 404, the BMC may connect to the client device that is being used to launch the virtual console and collect the environmental parameters of the client device. For example, data collection module 210 may connect to client device 208 and collect the environmental parameters of client device 208 (e.g., collect environmental parameters of client device 208 such as type of OS, OS version, date of install, etc.), information regarding the display (e.g., type of display, type of video driver, video driver version, type of video controller, video controller version, etc.), and information regarding the display configuration settings (e.g., resolution, refresh rate, color format, etc.)).

At 406, the BMC may collect the environmental parameters of the server whose virtual console is being launched. For example, data collection module 210 may collect the environmental parameters of the server corresponding to server OS 206 (e.g., collect environmental parameters from server OS 206 such as the server display configuration parameter settings (e.g., resolution, refresh rate, color format, etc.). Data collection module 210 can also collect other server environmental parameters, such as the video capabilities of the server. In one embodiment, data collection module 210 may collect some of the server environmental parameters upon completion of the install of server OS 206 on the server.

At 408, a check may be made to determine whether a previously created server display configuration exists for this particular launch of the virtual console of the server. For example, display configuration alignment module 212 may check or query display configuration repository 216 for a previously created server display configuration for the user using client device 208 to launch the virtual console of the server corresponding to server OS 206).

If a previously created server display configuration exists for this particular launch of the virtual console of the server, at 410, the BMC may use the previously created server display configuration to appropriately configure the display configuration of the server whose virtual console is being launched. For example, display configuration alignment module 212 may retrieve the previously created server display configuration from display configuration repository 216 and use the previously created server display configuration to appropriately configure the display configuration of the server corresponding to server OS 206.

Otherwise, if a previously created server display configuration does not exist for this particular launch of the virtual console of the server, at 412, the BMC may analyze the collected environmental parameters of the client device and the server to determine an appropriate display configuration for the server. In some embodiments, the analysis of the collected environmental parameters of the client device and the server may be performed using a ML model. In some such embodiments, the ML model may be an ensemble model. For example, ensemble analytics engine 218 may predict (i.e., determine) an appropriate server display configuration for the server whose virtual console is being launched (e.g., the server corresponding to server OS 206).

At 414, the BMC may use the determined server display configuration to appropriately configure the display configuration of the server whose virtual console is being launched. That is, the BMC may configure the display configuration of the server in accordance with the determined appropriate display configuration. Upon successfully configuring the display configuration of the server, the BMC may store the created server display configuration for later use. For example, ensemble analytics engine 218 may use the determined server display configuration to appropriately configure the display configuration of the server corresponding to server OS 206. Upon successfully configuring the display configuration of the server corresponding to server OS 206, ensemble analytics engine 218 may store the created server display configuration in display configuration repository 216.

Figure 5:
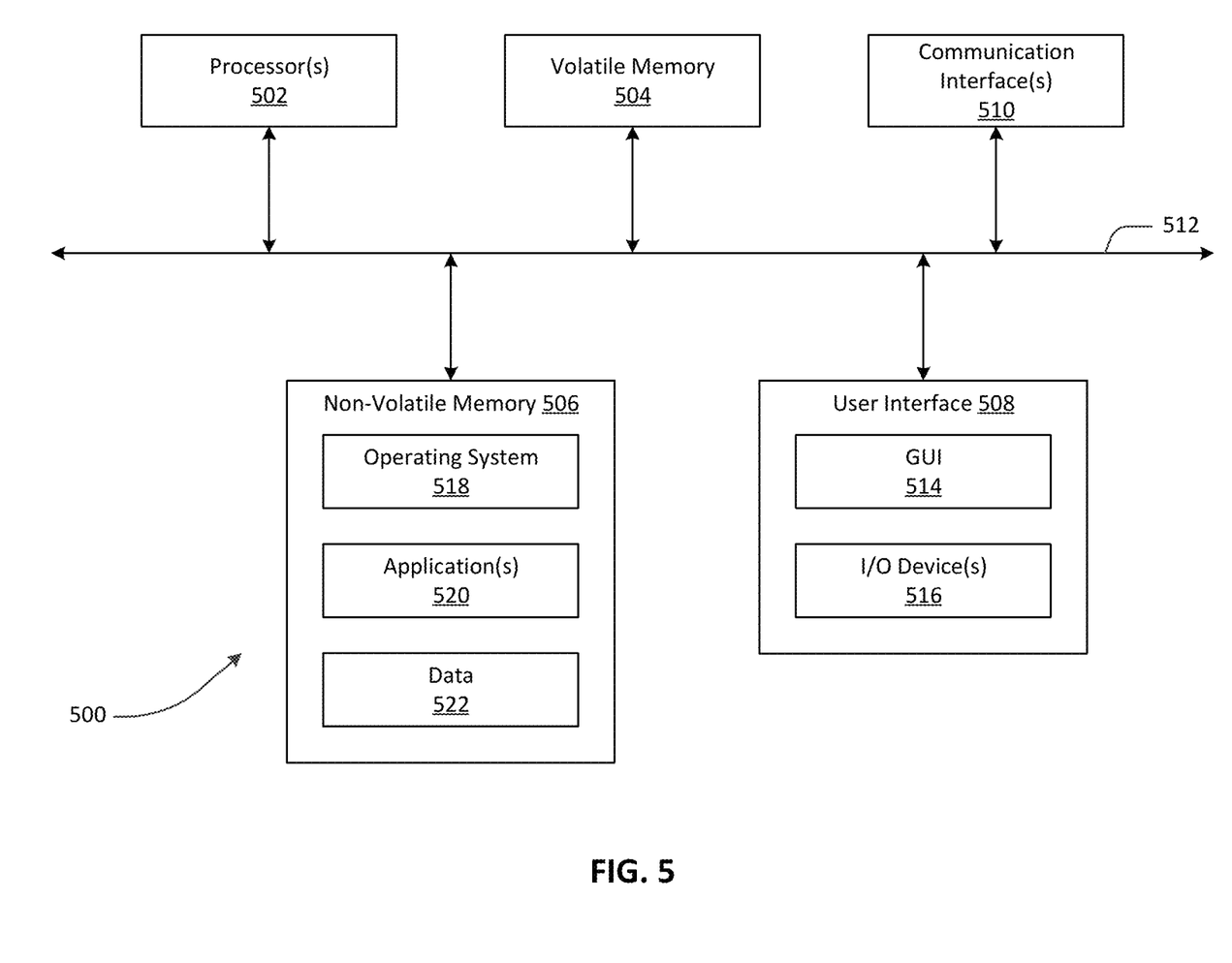
FIG. 5 is a block diagram illustrating selective components of an example computing device in which various aspects of the disclosure may be implemented, in accordance with an embodiment of the present disclosure.

FIG. 5 is a block diagram illustrating selective components of an example computing device 500 in which various aspects of the disclosure may be implemented, in accordance with an embodiment of the present disclosure. For instance, client device 208 and server computing device 204 of FIG. 2 can be substantially similar to computing device 500. As shown, computing device 500 includes one or more processors 502, a volatile memory 504 (e.g., random access memory (RAM)), a non-volatile memory 506, a user interface (UI) 508, one or more communications interfaces 510, and a communications bus 512.

Non-volatile memory 506 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

User interface 508 may include a graphical user interface (GUI) 514 (e.g., a touchscreen, a display, etc.) and one or more input/output (I/O) devices 516 (e.g., a mouse, a keyboard, a microphone, one or more speakers, one or more cameras, one or more biometric scanners, one or more environmental sensors, and one or more accelerometers, etc.).

Non-volatile memory 506 stores an operating system 518, one or more applications 520, and data 522 such that, for example, computer instructions of operating system 518 and/or applications 520 are executed by processor(s) 502 out of volatile memory 504. In one example, computer instructions of operating system 518 and/or applications 520 are executed by processor(s) 502 out of volatile memory 504 to perform all or part of the processes described herein (e.g., processes illustrated and described in reference to FIGS. 2 through 4). In some embodiments, volatile memory 504 may include one or more types of RAM and/or a cache memory that may offer a faster response time than a main memory. Data may be entered using an input device of GUI 514 or received from I/O device(s) 516. Various elements of computing device 500 may communicate via communications bus 512.

The illustrated computing device 500 is shown merely as an illustrative client device or server and may be implemented by any computing or processing environment with any type of machine or set of machines that may have suitable hardware and/or software capable of operating as described herein.

Processor(s) 502 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

Processor 502 may be analog, digital or mixed signal. In some embodiments, processor 502 may be one or more physical processors, or one or more virtual (e.g., remotely located or cloud computing environment) processors. A processor including multiple processor cores and/or multiple processors may provide functionality for parallel, simultaneous execution of instructions or for parallel, simultaneous execution of one instruction on more than one piece of data.

Communications interfaces 510 may include one or more interfaces to enable computing device 500 to access a computer network such as a Local Area Network (LAN), a Wide Area Network (WAN), a Personal Area Network (PAN), or the Internet through a variety of wired and/or wireless connections, including cellular connections.

In described embodiments, computing device 500 may execute an application on behalf of a user of a client device. For example, computing device 500 may execute one or more virtual machines managed by a hypervisor. Each virtual machine may provide an execution session within which applications execute on behalf of a user or a client device, such as a hosted desktop session. Computing device 500 may also execute a terminal services session to provide a hosted desktop environment. Computing device 500 may provide access to a remote computing environment including one or more applications, one or more desktop applications, and one or more desktop sessions in which one or more applications may execute.

In the foregoing detailed description, various features of embodiments are grouped together for the purpose of streamlining the disclosure. This method of disclosure is not to be interpreted as reflecting an intention that the claims require more features than are expressly recited. Rather, inventive aspects may lie in less than all features of each disclosed embodiment.

As will be further appreciated in light of this disclosure, with respect to the processes and methods disclosed herein, the functions performed in the processes and methods may be implemented in differing order. Additionally or alternatively, two or more operations may be performed at the same time or otherwise in an overlapping contemporaneous fashion. Furthermore, the outlined actions and operations are only provided as examples, and some of the actions and operations may be optional, combined into fewer actions and operations, or expanded into additional actions and operations without detracting from the essence of the disclosed embodiments.

Elements of different embodiments described herein may be combined to form other embodiments not specifically set forth above. Other embodiments not specifically described herein are also within the scope of the following claims.

Reference herein to "one embodiment" or "an embodiment" means that a particular feature, structure, or characteristic described in connection with the embodiment can be included in at least one embodiment of the claimed subject matter. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the words "exemplary" and "illustrative" are used herein to mean serving as an example, instance, or illustration. Any aspect or design described herein as "exemplary" or "illustrative" is not necessarily to be construed as preferred or advantageous over other aspects or designs. Rather, use of the words "exemplary" and "illustrative" is intended to present concepts in a concrete fashion.

In the description of the various embodiments, reference is made to the accompanying drawings identified above and which form a part hereof, and in which is shown by way of illustration various embodiments in which aspects of the concepts described herein may be practiced. It is to be understood that other embodiments may be utilized, and structural and functional modifications may be made without departing from the scope of the concepts described herein. It should thus be understood that various aspects of the concepts described herein may be implemented in embodiments other than those specifically described herein. It should also be appreciated that the concepts described herein are capable of being practiced or being carried out in ways which are different than those specifically described herein.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

All examples and conditional language recited in the present disclosure are intended for pedagogical examples to aid the reader in understanding the present disclosure, and are to be construed as being without limitation to such specifically recited examples and conditions. Although illustrative embodiments of the present disclosure have been described in detail, various changes, substitutions, and alterations could be made hereto without departing from the scope of the present disclosure. Accordingly, it is intended that the scope of the present disclosure be limited not by this detailed description, but rather by the claims appended hereto.

What is claimed is:

1. A computer implemented method comprising:
   responsive to a virtual console of a server being launched on a client device via a baseboard management controller (BMC):
   collecting, by the BMC from the client device, one or more environment parameters of the client device;
   collecting, by the BMC, one or more environmental parameters of the server;
   determining, by the BMC, an appropriate display configuration for the server based on an analysis using a machine learning (ML) model of the one or more environment parameters of the client device and the one or more environmental parameters of the server; and
   configuring, by the BMC, a display configuration of the server in accordance with the determined appropriate display configuration.

2. The method of claim 1, wherein the one or more environment parameters of the client device includes information regarding at least one of an installed operating system (OS) of the client device, a display of the client device, or a display configuration setting of the client device.

3. The method of claim 1, wherein the one or more environmental parameters of the server includes information regarding at least one of an installed operating system (OS) of the server, a display of the server, or video capabilities of the server.

4. The method of claim 1, wherein the ML model includes an ensemble model.

5. The method of claim 1, wherein determining an appropriate display configuration for the server includes creating a server display configuration, and the method further comprising:
   responsive to a successful configuration of the display configuration of the server in accordance with the created server display configuration, storing, by the BMC, the created server display configuration in a display configuration repository.

6. The method of claim 5, further comprising, responsive to the virtual console of the server being launched on the client device via the BMC another time:
   determining, by the BMC, that the stored created server display configuration exists for the launch of the virtual console of the server; and
   responsive to the determination that the stored created server display configuration exists, configuring, by the BMC, the display configuration of the server in accordance with the previously the stored created display configuration.

7. A system comprising:
one or more non-transitory machine-readable mediums configured to store instructions; and
one or more processors configured to execute the instructions stored on the one or more non-transitory machine-readable mediums, wherein execution of the instructions causes the one or more processors to carry out a process comprising:
responsive to a virtual console of a server being launched on a client device via a baseboard management controller (BMC):
collecting, by the BMC from the client device, one or more environment parameters of the client device;
collecting, by the BMC, one or more environmental parameters of the server;
determining, by the BMC, an appropriate display configuration for the server based on an analysis using a machine learning (ML) model of the one or more environment parameters of the client device and the one or more environmental parameters of the server; and
configuring, by the BMC, a display configuration of the server in accordance with the determined appropriate display configuration.

8. The system of claim 7, wherein the one or more environment parameters of the client device includes information regarding at least one of an installed operating system (OS) of the client device, a display of the client device, or a display configuration setting of the client device.

9. The system of claim 7, wherein the one or more environmental parameters of the server includes information regarding at least one of an installed operating system (OS) of the server, a display of the server, or video capabilities of the server.

10. The system of claim 7, wherein the ML model includes an ensemble model.

11. The system of claim 7, wherein determining an appropriate display configuration for the server includes creating a server display configuration, and wherein the process further comprises:
responsive to a successful configuration of the display configuration of the server in accordance with the created server display configuration, storing, by the BMC, the created server display configuration in a display configuration repository.

12. The system of claim 11, wherein the process further comprises, responsive to the virtual console of the server being launched on the client device via the BMC another time:
determining, by the BMC, that the stored created server display configuration exists for the launch of the virtual console of the server; and
responsive to the determination that the stored created server display configuration exists, configuring, by the BMC, the display configuration of the server in accordance with the stored created display configuration.

13. A computer implemented method comprising:
responsive to a virtual console of a server being launched on a client device via a baseboard management controller (BMC):
collecting, by the BMC from the client device, one or more environment parameters of the client device;
collecting, by the BMC, one or more environmental parameters of the server;
determining, by the BMC, whether a previously created server display configuration exists based on the one or more environment parameters of the client device and the one or more environmental parameters of the server;
responsive to a determination that the previously created server display configuration exists, configuring, by the BMC, a display configuration of the server in accordance with the previously created server display configuration; and
responsive to a determination that the previously created server display configuration does not exist, determining, by the BMC, an appropriate display configuration for the server based on an analysis using a machine learning (ML) model of the one or more environment parameters of the client device and the one or more environmental parameters of the server, and configuring, by the BMC, a display configuration of the server in accordance with the determined appropriate display configuration.

14. The method of claim 13, further comprising, responsive to a successful configuration of the display configuration of the server in accordance with the determined appropriate server display configuration, storing the determined appropriate server display configuration in a display configuration repository.

15. The method of claim 5, further comprising, responsive to the virtual console of the server being launched on the client device via the BMC another time:
determining, by the BMC, whether the stored created server display configuration exists for the server and the client device; and
responsive to a determination that the stored created server display configuration exists for the server and the client device, configuring, by the BMC, the display configuration of the server in accordance with the stored created server display configuration.

16. The method of claim 5, further comprising, responsive to the virtual console of the server being launched on the client device via the BMC another time by a user of the client device:
determining, by the BMC, whether the stored created server display configuration exists for the server, the client device, and the user of the client device; and
responsive to a determination that the stored created server display configuration exists for the server, the client device, and the user, configuring, by the BMC, the display configuration of the server in accordance with the stored created server display configuration.

17. The method of claim 5, wherein the ensemble model comprises multiple ML algorithms, each of the multiple ML algorithms generating a prediction of a display configuration for the server, wherein the predictions of the multiple ML algorithms are combined to generate the appropriate display configuration for the server.

18. The system of claim 11, the process further comprising, responsive to the virtual console of the server being launched on the client device via the BMC another time:
determining, by the BMC, that the stored created server display configuration exists for the server and the client device; and
responsive to the determination that the stored created server display configuration exists for the server and the client device, configuring, by the BMC, the display configuration of the server in accordance with the stored created display configuration.

19. The system of claim 11, the process further comprising, responsive to the virtual console of the server being launched on the client device via the BMC another time by a user of the client device:
  determining, by the BMC, that the stored created server display configuration exists for the server, the client device, and the user of the client device; and
  responsive to the determination that the stored created server display configuration exists for the server, the client device, and the user, configuring, by the BMC, the display configuration of the server in accordance with the stored created server display configuration.

20. The system of claim 10, wherein the ensemble model comprises multiple ML algorithms, each of the multiple ML algorithms generating a prediction of a display configuration for the server, wherein the predictions of the multiple ML algorithms are combined to generate the appropriate display configuration for the server.

\* \* \* \* \*